(12) United States Patent
Noda et al.

(10) Patent No.: US 7,590,325 B2
(45) Date of Patent: Sep. 15, 2009

(54) TWO-DIMENSIONAL PHOTONIC CRYSTAL OPTICAL MULTIPLEXER/DEMULTIPLEXER

(75) Inventors: Susumu Noda, Uji (JP); Masamitu Mochizuki, Chino (JP); Takashi Asano, Kyoto (JP)

(73) Assignee: Japan Science and Technology Agency, Kawaguchi (JP)

( * ) Notice: Subject to any disclaimer, the term of this patent is extended or adjusted under 35 U.S.C. 154(b) by 238 days.

(21) Appl. No.: 10/507,889

(22) PCT Filed: Mar. 26, 2003

(86) PCT No.: PCT/JP03/03762

§ 371 (c)(1),
(2), (4) Date: Sep. 17, 2004

(87) PCT Pub. No.: WO03/081304

PCT Pub. Date: Oct. 2, 2003

(65) Prior Publication Data

US 2005/0146778 A1      Jul. 7, 2005

(30) Foreign Application Priority Data

Mar. 26, 2002    (JP)  .............................. 2002-086221

(51) Int. Cl.
*G02B 6/10*    (2006.01)

(52) U.S. Cl. ...................... 385/129; 385/130; 385/131; 385/45

(58) Field of Classification Search .......... 385/129–132
See application file for complete search history.

(56) References Cited

U.S. PATENT DOCUMENTS 5,784,400 A    7/1998    Joannopoulos et al.
(Continued)

FOREIGN PATENT DOCUMENTS

JP    A 2001-272555    10/2001
(Continued)

OTHER PUBLICATIONS

Koops H W P; "Photonic Crystals Build by Three-Dimensional Additive Lithography Enable Integrated Optics of High Density"; Proceedings of SPIE, SPIE, Bellingham, VA, US; vol. 2849, Aug. 5, 1996, pp. 250-256, XP 000617864.

*Primary Examiner*—Frank G Font
*Assistant Examiner*—Eric Wong
(74) *Attorney, Agent, or Firm*—Oliff & Berridge, PLC (57) ABSTRACT

The present invention provides an optical multiplexer/demultiplexer that can be smaller in size and higher in Q-factor or efficiency. This object is achieved by the following construction. In a slab-shaped body 11, low refractive index areas 12 having a refractive index lower than that of the material of the body 11 are periodically arranged to construct a two-dimensional photonic crystal, in which a waveguide 13 is formed by not boring holes 12 linearly. A donor type cluster defect 14 is formed by not boring holes 12 at two ore more lattice points located adjacent to the waveguide 13. With this construction, only a specific wavelength of light included in the light propagating through the waveguide 13 resonates at the donor type cluster 14, and the light thus trapped is released to the outside (demultiplexing). Conversely, only a specific wavelength of light may be introduced through the donor type cluster defect 14 into the waveguide 13 (multiplexing).

18 Claims, 10 Drawing Sheets

U.S. PATENT DOCUMENTS

| | | | |
|---|---|---|---|
| 6,512,866 B1 * | 1/2003 | Fan et al. | 385/27 |
| 6,618,535 B1 * | 9/2003 | Reynolds | 385/129 |
| 6,775,430 B2 * | 8/2004 | Flory et al. | 385/16 |
| 6,891,993 B2 * | 5/2005 | Prather et al. | 385/24 |
| 2002/0009277 A1 | 1/2002 | Noda et al. | |
| 2003/0161577 A1 * | 8/2003 | Wilson et al. | 385/27 |
| 2004/0126055 A1 * | 7/2004 | Flory et al. | 385/16 |

FOREIGN PATENT DOCUMENTS

WO    WO 98/57207    12/1998

* cited by examiner

Single Lattice Point Filled
(Comparative Example)

Two Lattice Points Filled

Three Lattice Points Filled

Pattern 1
Triangluar Defect

Pattern 2

Pattern 3
Straight Line Defect

Triangular        Straight Line

| Defect Position | Resonance Frequency | Q |
|---|---|---|
| 3rd Column | 0.26790 | 2012 |
| 4th Column | 0.26745 | 2651 |
| 5th Column | 0.26735 | 3885 |
| 6th Column | 0.26733 | 4666 |

First Forbidden Band Zone | Second Forbidden Band Zone

Fig. 18

First Forbidden Band Zone | Second Forbidden Band Zone

Fig. 19

Donor Type Cluster Defect

| Percentage of Structural Change | Resonance Frequency | Q | $Q_v$ | $Q_p$ | $Q_p/Q_v$ |
|---|---|---|---|---|---|
| -1% | $0.266649c/a_2$ (+0.69%) | 2891 | 5039 | 6784 | 1.34 |
| 0% (Reference) | $0.2675c/a_1$ | 2651 | 5769 | 4904 | 0.85 |
| 1% | $0.26849c/a_2$ (-0.62%) | 2885 | 5206 | 6474 | 1.24 |

Acceptor Type Point Defect

| Percentage of Structural Change | Resonance Frequency | Q | $Q_v$ | $Q_p$ | $Q_p/Q_v$ |
|---|---|---|---|---|---|
| -1% | $0.2719c/a_2=0.27462\,c/a_1$ | 470 | 975 | 906 | 0.93 |
| 0% (Reference) | $0.2728c/a_1$ | 482 | 1040 | 899 | 0.86 |
| 1% | $0.2738c/a_2=0.27101\,c/a_1$ | 484 | 958 | 978 | 1.02 |

TWO-DIMENSIONAL PHOTONIC CRYSTAL OPTICAL MULTIPLEXER/DEMULTIPLEXER

TECHNICAL FIELD

The present invention relates to an optical multiplexing/demultiplexing device used for wavelength division multiplexing communication.

BACKGROUND ART

Recently, photonic crystals have been drawing attentions as a new optical device. A photonic crystal is an optical functional material having a periodic distribution of refractive index, which provides a band structure with respect to the energy of photons. One of its particular features is that it has an energy region (called the photonic bandgap) that does not allow the propagation of light.

An example of the application fields of the photonic crystal is the optical communication. Recent optical communications use the wavelength division multiplexing (WDM) in place of a conventional method called the time division multiplexing (TDM). The wavelength division multiplexing is a communication method in which plural wavelengths of light, each carrying a different signal, propagate through a single transmission line. This method has drastically increased the amount of information that can be transmitted per unit of time.

In wavelength division multiplexing, plural wavelengths of light are mixed at the inlet of the transmission line, and the mixture of light is separated into the plural wavelengths of light at the outlet. This requires an optical multiplexer and an optical demultiplexer, or wavelength filters. A type of demultiplexers currently used is arrayed weveguide grating (AWG). AWG uses a normal type of waveguide. With this construction, it is currently necessary to make the device as large as roughly several square centimeters to adequately decrease the loss of light.

Taking into account the above-described situation, research has been conducted on the miniaturization of demultiplexers by using a device composed of a photonic crystal as the multiplexer or demultiplexer, as disclosed in the Japanese Unexamined Patent Publication No. 2001-272555, which is referred to as "Prior Art Document 1" hereinafter. A brief description of the demultiplexer using a photonic crystal follows. When an appropriate defect is introduced in the photonic crystal, the defect creates an energy level, called the defect level, within the photonic bandgap. This state allows the light to exist only at a specific wavelength corresponding to the energy of the defect level within the wavelength range corresponding to the energies included in the photonic bandgap. There, when the defects in the crystal have a linear arrangement, the device functions as an optical waveguide, while it functions as an optical resonator when the defect or defects have a point-like form in the crystal.

When a ray of light including various wavelength components is propagated through the waveguide of a photonic crystal having an appropriate point defect located in proximity to the waveguide, only a specific component of light having a wavelength corresponding to the resonance frequency of the point defect is trapped by the point defect. Taking out the light will make the device a demultiplexer for a desired wavelength. In reverse, a ray of light having a wavelength corresponding to the resonance frequency may be introduced from the point defect into the photonic crystal and propagated through the waveguide with other components of light having different wavelengths. This makes the device a multiplexer for a desired wavelength.

For photonic crystals used as a multiplexer or demultiplexer, both two-dimensional and three-dimensional crystals may be used, each of which has its own features and advantages. The following description takes the two-dimensional crystal as an example, which is relatively easier to manufacture. In two-dimensional crystals, there is a significant difference in the refractive index in the direction perpendicular to its surface, or in the orthogonal direction, between the crystal body and the air so that it can confine light in the orthogonal direction.

Prior Art Document 1 discloses a study in which cylindrical holes of the same diameter are periodically arranged in a slab made of InGaAsP, a line of the cylindrical holes is filled to form an optical waveguide, and a defect is introduced by designing at least one of the cylindrical holes to have a diameter different from that of the other holes to create an optical resonator In this structure, the lattice constant a is set at a value corresponding to the wavelength of light that should be propagated (in the above example, it is set at 1.55 µm, which is one of the wavelengths generally used in wavelength division multiplexing communications), the radius of the cylindrical hole formed at each lattice point is set at 0.29a except for one hole whose radius is set at 0.56a to create a point defect. With this configuration, a ray of light having a normalized frequency f=0.273 is radiated upwards and downwards from the point defect in the orthogonal direction of the slab. The Q-factor obtained thereby is about 500. It should be noted that a normalized frequency is a non-dimensional value obtained by multiplying the frequency of light by a/c, where c is the speed of light. The Q-factor indicates the quality of the resonator. The higher the Q-factor is, the higher the wavelength resolution. When the radius of one cylindrical hole is 0.56a and that of another hole is 0.58a, the normalized frequencies will be 0.2729 and 0.2769, respectively, so that two rays of light having different wavelengths are generated. The Q-factors for both holes are about 500.

As mentioned above, Prior Art Document 1 teaches that two-dimensional photonic crystals can be used as optical demultiplexers. These demultiplexers, however, need further improvements with regard to some points relating to Q-factor, as explained below. In the case of Prior Art Document 1, the Q-factor is about 500. With this value, the wavelength resolution of the above-described optical resonator is about 3 nm for the wavelength band of 1.55 µm, because the wavelength resolution of an optical resonator for wavelength $\lambda$ is given by $\lambda/Q$. For a resonator to be applicable to high-density wavelength division multiplexing optical communications, however, the wavelength resolution must be about 0.8 nm or less, meaning that the Q-factor must be about 2000 or greater. One possible factor against the improvement in Q-factor in Prior Art Document 1 is an increase in the loss of energy of light in the orthogonal direction due to the introduction of the point defect.

The decrease in Q-factor may also result from asymmetry that may be introduced into a point defect. For example, as mentioned in Prior Art Document 1, a point defect may be designed to be asymmetrical in the direction orthogonal to the plane so that light is taken out only from one side of the two-dimensional plane. Otherwise, a point defect may be designed to be asymmetrical in the in-plane direction to take out a ray of polarized light. For example, when the point defect is circular, the light emitted from the defect is not polarized. However, it is often necessary to linearly polarize the light so as to couple it to an external optical system, or for some other purposes.

The present invention has been accomplished to solve such problems, and one of its objects is to provide an optical multiplexer/demultiplexer that can be smaller in size and higher in Q-factor or efficiency. Another object is to provide an optical multiplexer/demultiplexer that shows a high level of efficiency even when it has asymmetry introduced in the orthogonal direction or when polarized light needs to be obtained.

DISCLOSURE OF THE INVENTION

To solve the aforementioned problems, in the first mode of the present invention, the two-dimensional photonic crystal optical multiplexer/demultiplexer includes:

a) a slab-shaped body;

b) a plurality of modified refractive index areas having a refractive index different from that of the body, which are periodically arranged in the body;

c) a waveguide formed in the body by creating a linear defect of the modified refractive index areas; and d) a cluster defect located in proximity to the waveguide and composed of two or more defects adjacent to each other.

Also, in the second mode of the present invention, the two-dimensional photonic crystal optical multiplexer/demultiplexer includes:

a) a slab-shaped body;

b) two or more forbidden band zones formed in the body;

c) a plurality of modified refractive index areas having a refractive index different from that of the body, which are periodically arranged within each of the forbidden band zones of the body in a periodic pattern that is differently determined for each of the forbidden band zones;

d) a waveguide passing through all the forbidden band zones, which is formed by creating a linear defect of the modified refractive index areas within each of the forbidden band zones; and e) point-like defects each formed in proximity to the waveguide within each of the forbidden band zones.

The first mode of the present invention is described. According to the present invention, a plate-shaped slab with its thickness adequately smaller than its size in the in-plane direction is used as the body of the two-dimensional photonic crystal optical multiplexer/demultiplexer. On this body, modified refractive index areas having a refractive index different from that of the body are periodically arranged. The presence of the periodical arrangement of the modified refractive index areas generates a photonic bandgap, which does not allow the presence of light whose energy falls within the range of the photonic bandgap. This means that the light having a wavelength corresponding to that energy cannot pass through the body.

The refractive index of the modified refractive index area may be higher or lower than that of the body. From the viewpoint of easier material selection, however, it is recommendable to make the modified refractive index area from a material having a low refractive index, because the body is usually made from a material having a high refractive index.

The low refractive index area may be created by embedding a material having a low refractive index in the body or just forming a hole in the body. In the latter case, the air constitutes the modified refractive index area. Practically, air is the material that has the lowest refractive index. Therefore, forming a hole is advantageous to increase the difference in the refractive index between the modified refractive index area and the body. Furthermore, forming a hole is easier than embedding a different material.

In the following description, the points at which the modified refractive index areas are periodically placed are called the lattice points. The lattice points can be arranged in various patterns. Typical examples include the square lattice pattern or triangular lattice pattern.

In a photonic crystal having a periodicity as described above, a defect of a modified refractive index area at a lattice point creates a disorder in the periodicity. If a parameter or parameters relating to the defect are appropriately determined, the disorder in the periodicity creates a "defect level" within the photonic bandgap, which generates a point that allows the presence of light within the body in which light is not basically allowed to exist. This is called a point defect. Creating point defects along a line forms a waveguide within the body, which light can pass through. This is called the line defect. A line defect may take the form of a bent or curved line as well as a straight line. A line defect may be composed of a single row of lattice points or a bundle of multiple rows of lattice points lying side by side.

In the case of forming the modified refractive index areas with the holes, the easiest method of creating a defect at a lattice point is to fill the hole at the lattice point with the material of the body, that is, to omit boring a hole at the lattice point. Alternatively, increasing the diameter of a hole makes the hole a defect. A defect created by not boring a hole at a lattice point is called the donor type defect, and a defect created by increasing the diameter of the hole is called the acceptor type defect.

In the first mode of the present invention, the donor type defect and the acceptor type defect are described. This specification refers to the refractive index because the present invention concerns light including infrared and ultraviolet rays. In general, however, a photonic crystal is created by a periodic difference in the dielectric constant. Therefore, to create a defect, the dielectric constant of one of the modified refractive index areas (or lattice points) periodically arranged in the body should be changed. A lattice point whose dielectric constant is higher than that of the others is called the donor type defect, and that with lower dielectric constant is called the acceptor type defect. When, as described previously, holes are arranged in a body made from a certain material and no hole is bored (or the hole is filled with the body material) at a certain lattice point to create a defect, the dielectric constant at the point is higher than that of air, so that the point becomes a donor type defect. In contrast, increasing the diameter of the hole at a lattice point will decrease the dielectric constant at that point, and the point will be an acceptor type defect.

Another type of defect whose characteristics are different from the defect made of a single lattice point is formed by making defects at two or more lattice points adjacent to each other in proximity to the waveguide. Hereinafter, a defect composed of a single lattice point is called the "point defect." The defect disclosed in Prior Art Document 1 is the point defect in this sense. On the other hand, the defect used in the first mode of the present invention is composed of two or more lattice points adjacent to each other, which is called the "cluster defect" hereinafter. Further, the "point defect" and "cluster defect" are generally called the "point-like defect" in this specification. These will be used in the second mode of the present invention described later.

In the above-described construction, a desired defect level can be created within the photonic bandgap by appropriately determining the parameters of the cluster defect, such as the number or arrangement of lattice points included in a cluster defect, the position of the cluster defect (e.g. distance from the waveguide), or the lattice constant a of the body. Then, among various wavelengths of light passing through the waveguide, only the light having the wavelength corresponding to the defect level resonates at the position of the defect. The resonant light is emitted in the orthogonal direction of the photonic crystal. A desired wavelength of light can be obtained by adjusting the aforementioned parameters so that the defect level is created at an appropriate energy level.

When the cluster defect is composed of two or more defects lying on a straight line, the defects generate a ray of light polarized in the width direction of the cluster defect.

By designing the cluster defect to be asymmetrical in the orthogonal direction, it is possible to produce an asymmetrical emission of light in the upward and downward directions from the two-dimensional photonic crystal. One method of creating an asymmetrical defect is to create a modified refractive index area whose thickness extends from one face of the body to an intermediate point inside the body. The thickness should be preferably from 5 to 40%, more preferably from 20 to 30%, of the thickness of the body, as described later.

To make a cluster defect asymmetrical in the orthogonal direction, it is not necessary to make each lattice point asymmetrical, as described above. For example, in a cluster defect composed of two lattice points adjacent to each other, the above-described work (i.e. forming an area having low refractive index on one side only) may be performed on an intermediate point between the two lattice points.

So far, this specification has described the function of photonic crystals as a demultiplexer. It should be noted that the above-described photonic crystals may be used as a multiplexer. When a ray of light having a wavelength corresponding to the energy of the defect level is introduced into the cluster defect, it will be mixed with the light passing through the waveguide.

It is also possible to mix or separate two or more wavelengths of light by providing two or more cluster defects having different numbers or arrangements of lattice points.

The second mode of the present invention is described. The description of the first mode has shown that optical multiplexing/demultiplexing can be performed at various wavelengths by changing the number or arrangement of lattice points at which the defects are located. It has been also explained that a preferable form of the modified refractive index area is a hole, and the defect should be preferably a donor type defect obtained by not boring the hole. The donor type defect, however, has less degree of freedom for wavelength variation than the acceptor type defect created by increasing the diameter of the hole. This is because the acceptor type defect allows an arbitrary variation of the hole size, whereas the donor type defect is created by simply filling the hole with the body material, and this method has little degree of freedom for variation. Grouping donor type defects into a cluster type defect according to the first mode of the present invention provides an additional degree of freedom for changing the number or arrangement of lattice points included in the cluster defect. This degree of freedom, however, is still limited. The second mode of the present invention solves this problem concerning the donor type defect, as described below.

According to the second mode of the present invention, the body is divided into the same number of zones as the multiplexing/demultiplexing wavelengths, and the modified refractive index areas are periodically arranged in a different cycle within each zone. The zone is called the forbidden band zone in this specification.

Similar to the first mode, the modified refractive index area should be preferably made from a material having a low refractive index, and preferably made from air, i.e. a hole.

As in the first mode, a waveguide that passes through all the forbidden band zones is formed so as to let light pass through each forbidden band zone and be mixed. Furthermore, a point-like defect for multiplexing/demultiplexing is formed in each forbidden band zone. As explained previously, the "point-like defect" may be either a point defect composed of a single lattice point or a cluster defect composed of plural lattice points adjacent to each other. The point-like defects formed in the forbidden band zones are designed so that they differ from each other in resonance wavelength. This means that a two-dimensional photonic crystal optical multiplexer/demultiplexer having n pieces of forbidden band zones is capable of multiplexing/demultiplexing n pieces of wavelengths of light. This structure of two-dimensional photonic crystal in which plural forbidden band zones are present is called the "in-plane heterostructure".

The arrangement cycle (or the lattice constant) and point-like defects of the modified refractive index areas in each forbidden band zone are determined corresponding to the wavelengths of light to be multiplexed/demultiplexed. The ratio of the size of the modified refractive index area in one forbidden band zone to that in another should be preferably equal to the ratio of the arrangement cycle of the modified refractive index areas in the former forbidden band zone to that in the latter. When all the cluster defects placed in the forbidden band zones have the same form, the wavelength for the multiplexing/demultiplexing of light at each cluster defect is determined by the arrangement cycle of each forbidden band zone. It is naturally allowable to form a cluster defect having a different lattice point number or a different form in each forbidden band zone. The various types of cluster defects mentioned in the first mode can be also used hereby.

The principal object of the second mode of the present invention is to increase the degree of freedom for the donor type defects, which are created by not boring holes in the body. This construction of the second mode is also applicable to the acceptor type defect and provides a specific advantage for it. When two or more wavelengths of light are to be mixed or separated by acceptor type defects created by increasing the diameter of the hole at a certain lattice point, it has been conventionally necessary to form plural holes having different diameters in a single body slab. This construction, however, decreases the Q-factor. The second mode of the present invention can be preferably used to avoid such a decrease in Q-factor. That is, in plural forbidden band zones, modified refractive index areas are formed with different arrangement cycles corresponding to the plural wavelengths for optical multiplexing/demultiplexing. The ratio of the size of the modified refractive index area in one forbidden band zone to that in another, and the ratio of the size of the acceptor type point defect placed in one forbidden band zone to that in another, are set equal to the predetermined ratio of the arrangement cycle of the modified refractive index areas in the former forbidden band zone to that in the latter. This construction enables the multiplexing/demultiplexing of plural wavelengths of light without decreasing the Q-factor.

In the first mode of the present invention, the introduction of a cluster defect enables a multiplexer/demultiplexer to have higher Q-factor than in the case of using a point defect composed of a single lattice point. This is because the presence of the cluster defect increases the effective refractive index around the defect, which improves the light confining efficiency. The optical multiplexer/demultiplexer also exhibits high efficiency when it has asymmetry in the orthogonal direction or when it is used to produce polarized light.

In the second mode of the present invention, the in-plane heterostructure provides a higher degree of freedom for the selection of wavelengths for the multiplexing/demultiplexing of light even in the case of using donor type defects. The Q-factor obtained thereby is approximately equal to that of a photonic crystal for the multiplexing/demultiplexing of a single wavelength of light. When the donor type defect having a high Q-factor according to the first mode is used to construct the structure of the second mode, it will be relatively easy to obtain a device for multiplexing/demultiplexing various wavelengths of light with a high Q-factor. The second mode can also be effectively applied to the acceptor type defect.

BEST MODE FOR CARRYING OUT THE INVENTION

(1) Embodiment of the First Mode (1-1) Construction

Figure 1:
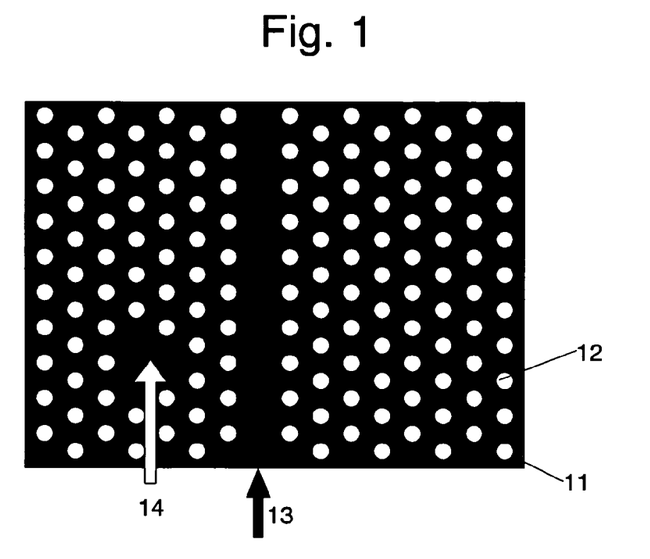
FIG. 1 is a schematic illustration showing a two-dimensional photonic crystal having a donor type cluster defect as the first mode of the present invention.

As an embodiment of the first mode of the present invention, a two-dimensional photonic crystal as schematically illustrated in FIG. 1 is described. The plate shown in FIG. 1 is a slab (or body) 11. For infrared light having a wavelength $\lambda=1.55$ μm used in normal optical communications, the slab 11 may be made from InGaAsP, which is transparent to that wavelength of infrared light. The slab 11 has holes 12 periodically arranged as the modified refractive index areas (or low refractive index areas) as shown by the white circles. The holes 12 shown in FIG. 1 are arranged in a triangular lattice pattern, which may be arranged in various patterns, such as a square lattice pattern.

Waveguide 13 is formed by not boring holes along a linear zone indicated by the solid arrow in FIG. 1. A donor type cluster defect 14 is formed by not boring holes at plural lattice points within the area indicated by the white arrow. In the following description, the process of forming a donor type cluster defect is often described as "fill the lattice points" because, on the drawing, the defect is illustrated as lattice points composed of holes filled with the body material.

Figure 2:
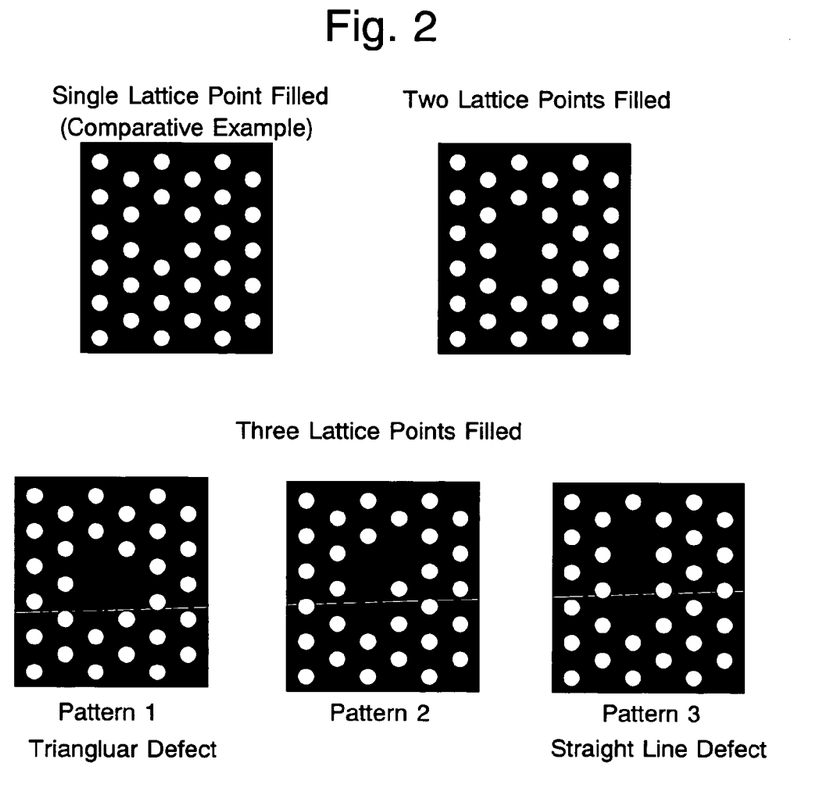
FIG. 2 is a schematic illustration showing examples of donor type cluster defects.

The example of FIG. 1 shows a donor type cluster defect with three lattice points filled. FIG. 2 shows various constructions for the donor type cluster defect. The examples shown in FIG. 2 have two or three lattice points filled. Though not shown in the drawing, it should be noted that it is possible to create a donor type cluster defect with more than three lattice points filled. Regarding the construction with three lattice points filled, FIG. 2 shows three types of defects. Among these types, the defect composed of three lattice points arranged as a triangle is called the "triangular defect", and the defect composed of three lattice points lying on a straight line is called the "straight line defect." Also, for the purpose of comparison, an example of the donor type defect (or donor type point defect) composed of a single lattice point is shown in FIG. 2.

(1-2) Check of Multiplexing/Demultiplexing Functionality

This section examines whether the above-described construction is actually applicable to the multiplexing/demultiplexing of light. The first step is to determine the wavelength band within the photonic bandgap in which the waveguide allows light to pass through, and the second step is to examine whether the donor type defect creates a defect level within the wavelength band. The analysis method used hereby is called the "two-dimensional plane wave expansion method".

In the plane wave expansion method, light propagating through a space having a periodic distribution of dielectric constant is expressed by a composition of plane waves. In the case of the TE mode in which the electric field oscillates in the in-plane direction and the magnetic field oscillates in the orthogonal direction, the Maxwell's equations for the magnetic field is written as follows:

$$\frac{\partial}{\partial x}\left[\frac{1}{\varepsilon_r(r)}\frac{\partial H_z}{\partial x}\right] + \frac{\partial}{\partial y}\left[\frac{1}{\varepsilon_r(r)}\frac{\partial H_z}{\partial y}\right] + \frac{\omega^2}{c^2}H_z = 0, \qquad (1)$$

where $\omega$ is the angular frequency of light, $H_z=H_z(x, y, \omega)$ is the magnetic field in z-direction at a point on the plane ($H_x$ and $H_y$ are zero), and c is the speed of light. $e_r(r)$ represents the periodic distribution of dielectric constant. Expansion of $e_r(r)$ by Fourier series and expansion of $H_z(x, y, \omega)$ by Bloch theorem give the following equations:

$$\frac{1}{\varepsilon_r(r)} = \sum_G \kappa(G)\exp\{jG \cdot r\} \quad (2)$$

$$H_z(x, \omega) = \sum_G h(k, G)\exp\{j(k+G) \cdot r\},$$

where k is the wave number vector and G is the reciprocal lattice vector. $\kappa(G)$ and $h(k,G)$ are expansion coefficients. Substituting equation (2) into equation (1) gives the following equation for $h(k, G)$, with G specified arbitrarily $$\sum_{G'} (k+G)\cdot(k+G')\kappa(G-G')h(k, G') = \left(\frac{\omega}{c}\right)^2 h(k, G) \quad (3)$$

Given a specific value of wave number vector k, this equation determines $(\omega/c)^2$ as the characteristic value, from which the corresponding frequency, or corresponding energy, is determined. Calculation of frequencies $\omega$ for various wave number vectors k enables the calculation of the photonic band structure.

Figure 3:
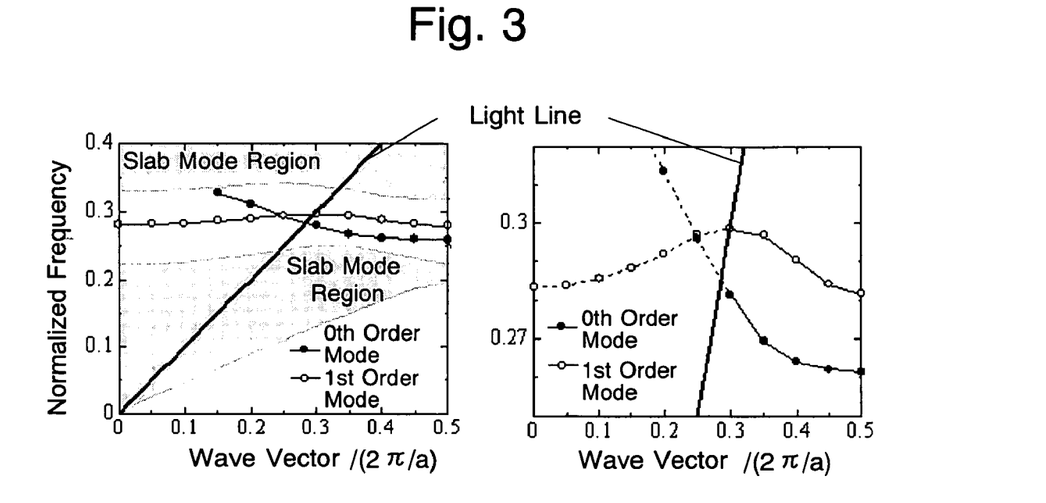
FIG. 3 shows graphs indicating the frequency band of the light passing through the waveguide.

Using equation (3), the frequency range of light propagating through the waveguide of a two-dimensional photonic crystal having no point-like defect has been calculated for the TE mode. The result is shown in FIG. 3. The right side graph is an enlarged view of a part of the left side graph. FIG. 3 shows that light can propagate in two guided modes: zeroth order mode, indicated by the black dots, and first order mode, indicated by the white dots. It is likely that the zeroth order mode provides higher efficiency because it is the single mode and convenient for external systems. The light located on the high-frequency side of the solid line named "Light Line" tends to be combined with the light existing in the free space and having the same frequency and the same in-plane wave number, whereby it leaks in the upward and downward directions, and the propagating efficiency is deteriorated. Therefore, it seems that the light having a normalized frequency within the range from 0.267 to 0.280, which is indicated by the black dots and narrow solid lines in the right side graph of FIG. 3, is propagated most efficiently through the waveguide. In other words, what is necessary hereby is to determine the lattice constant a so that the desired wavelength of light falls within the range from 0.267 to 0.280 in normalized frequency. For example, if the body is made from InGaAsP and the wavelength of the light used is 1.55 μm, a calculation based on the above-specified range of normalized frequency shows that the lattice constant a should be within the range from 0.42 to 0.43 μm.

Figure 4:
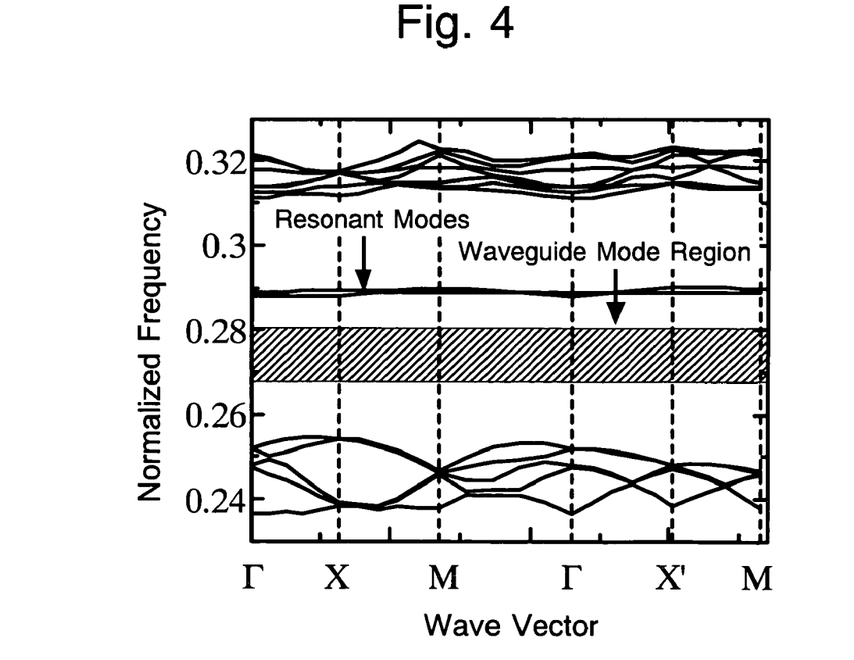
FIG. 4 is a graph showing the defect level created by the donor type cluster defect with a single lattice point filled.

The defect level has been calculated for the following types of cluster defects among those shown in FIG. 2: the type with two lattice points filled, the type with three lattice points filled as a triangle, and the type with three lattice points filled along a straight line. Also, for the purpose of comparison, the calculation has been performed on the donor type point defect composed of a single lattice point filled. The result is shown in FIGS. 4 to 7. In the case of the donor type point defect as a comparative example, the defect level is not created within the frequency range from 0.267c/a to 0.280c/a (which is referred to as the "available frequency range" hereinafter) within which light can propagate through the waveguide, as shown in FIG. 4, so that this construction cannot be used as a multiplexer/demultiplexer.

Figure 5:
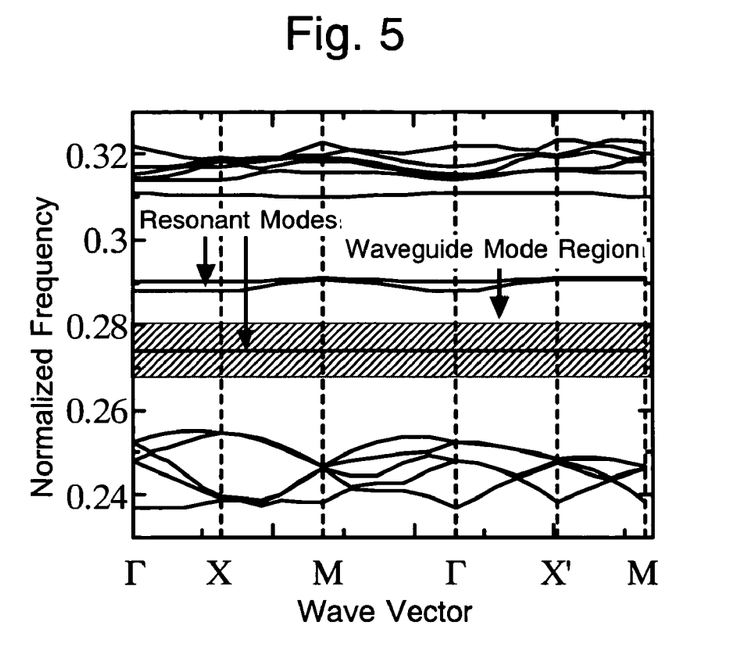
FIG. 5 is a graph showing the defect level created by the donor type cluster defect with two lattice points filled.
Figure 6:
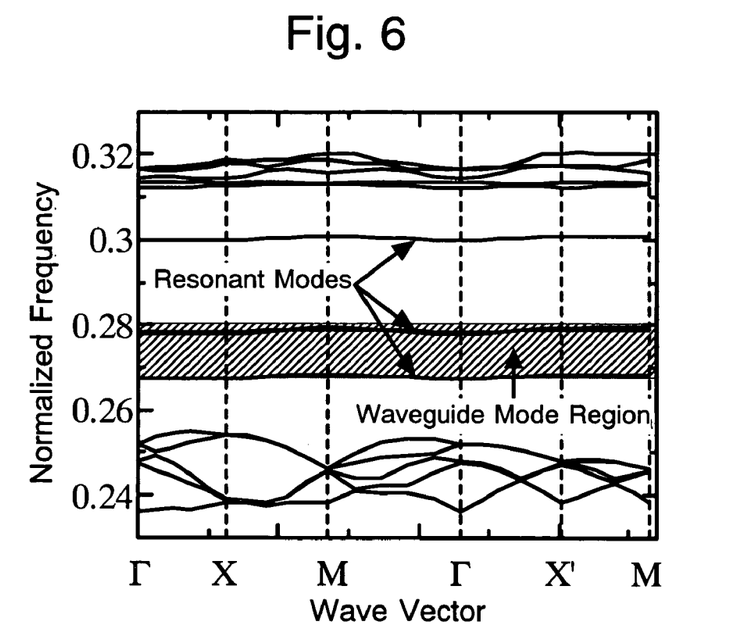
FIG. 6 is a graph showing the defect level created by the donor type cluster defect with three lattice points filled as a triangle.
Figure 7:
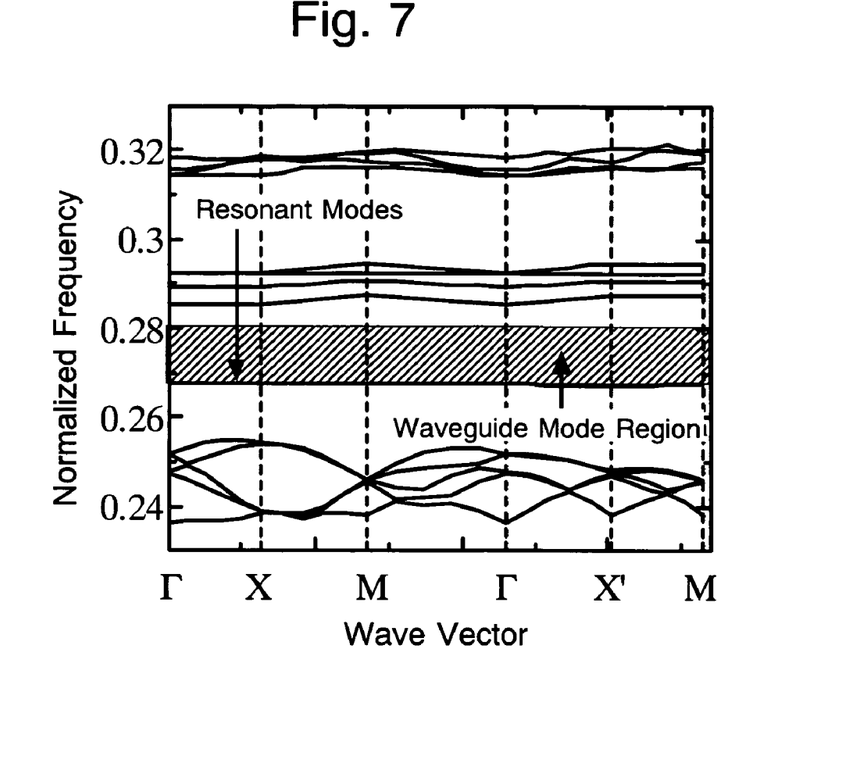
FIG. 7 is a graph showing the defect level created by the donor type cluster defect with three lattice points filled along a straight line.

In the case of the cluster defect created by filling two neighboring lattice points, on the other hand, only one defect level is created within the available frequency range, as shown in FIG. 5, so that this construction can be used as a multiplexer/demultiplexer. In the case of the cluster defect with three lattice points filled as a triangle, plural defect levels are created within the available frequency range, as shown in FIG. 6. Among these defect levels, the one located close to the normalized frequency 0.268 is isolated and adequately far from the other defect levels located on the higher frequency side. Therefore, this construction can be used as a multiplexer/demultiplexer. In the case of the cluster defect with three lattice points filled along a straight line parallel to the waveguide, only one defect level is created within the available frequency range, as shown in FIG. 7, so that this construction can be used as a multiplexer/demultiplexer.

Figure 8:
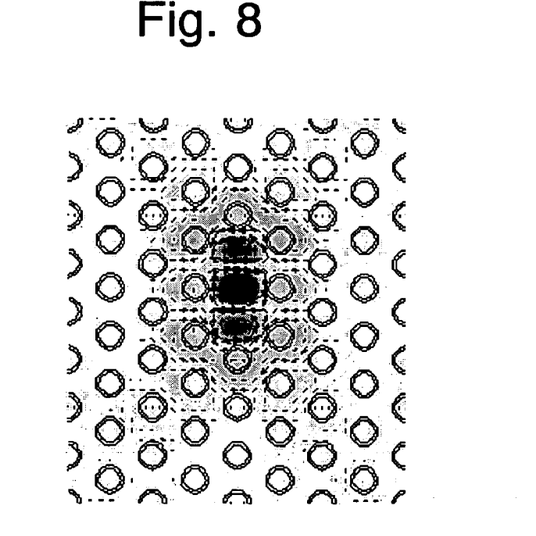
FIG. 8 is a graph showing the map of electromagnetic field around the donor type cluster defect with two lattice points filled.
Figure 9:
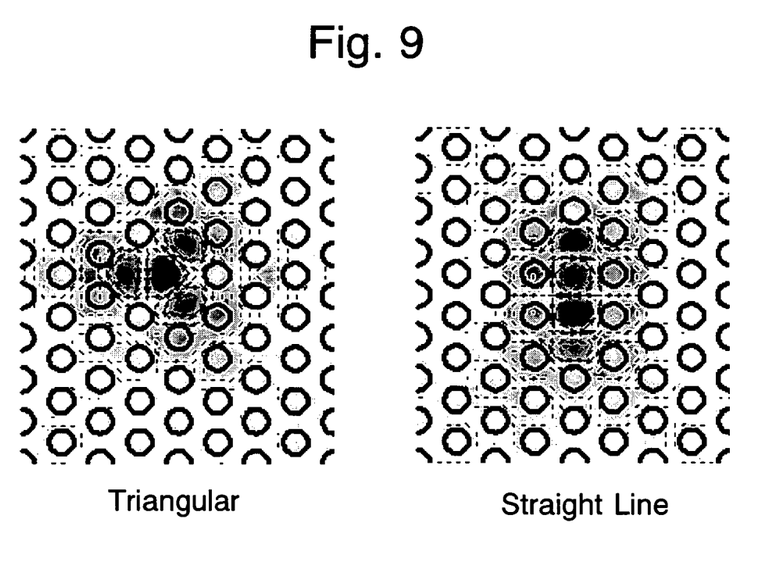
FIG. 9 is a graph showing the map of electromagnetic field around the donor type cluster defect with three lattice points filled.

The distribution of the electromagnetic field has been calculated for the following types which have been proved to be available for multiplexer/demultiplexers: the type with two neighboring lattice points filled, the type with three lattice points filled as a triangle, and the type with three lattice points filled along a straight line parallel to the waveguide. The result is shown in FIGS. 8 and 9. In these figures, the arrows indicate the electric field vectors parallel to the plane of drawing, and the grayscale patterns represent the amplitude of the magnetic field in the direction perpendicular to the plane of drawing. In the case of the defect with two lattice points filled or three lattice points filled along a straight line, the light that resonates at the defect is in the mode that propagates the light to the filled lattice points. The electric field is strong in the direction perpendicular to the line connecting the filled lattice points. This suggests that the resonant light has a characteristic close to linearly polarized light. In the case of the defect with three lattice points filled as a triangle, on the other hand, the resonant mode is such that the light propagates from the centroid to each apex of the triangle. This suggests that the electromagnetic field is distributed rather symmetrically, so that the polarization degree is lower than in the aforementioned two cases.

(1-3) Calculation of Q-factor

The Q-factor has been calculated for the three cases described in the previous paragraph, using the Finite-Difference Time-Domain method (K. S. Yee, "IEEE Trans. Antennas Propagat." AP-Vol. 14, pp. 302-307). The frequency dependency around the defect level has been calculated with respect to the intensity of the electromagnetic wave radiated, and the Q-factor has been calculated from the peak intensity and the full width at half maximum.

The Q-factor of a two-dimensional photonic crystal is determined by $Q_p$, which represents the coupling between the point-like defect and the waveguide, and $Q_s$, which represents the coupling between the point-like defect and the external (the space outside the surface). $Q_p$ is determined by the distance between the point-defect and the waveguide. Therefore, in order to investigate the change in Q-factor with respect to the type of the point-like defect, $Q_s$ has been calculated on the assumption that the distance between the point-like defect and the waveguide is infinite. The result is that $Q_s=1354$ when two lattice points are filled, $Q_s=2529$ when three lattice points are filled as a triangle, and $Q_s=5215$ when three lattice points are filled along a straight line. In the case of the acceptor type point defect disclosed in Prior Art Document 1, the same calculation shows that $Q_s=924$.

Figure 10:
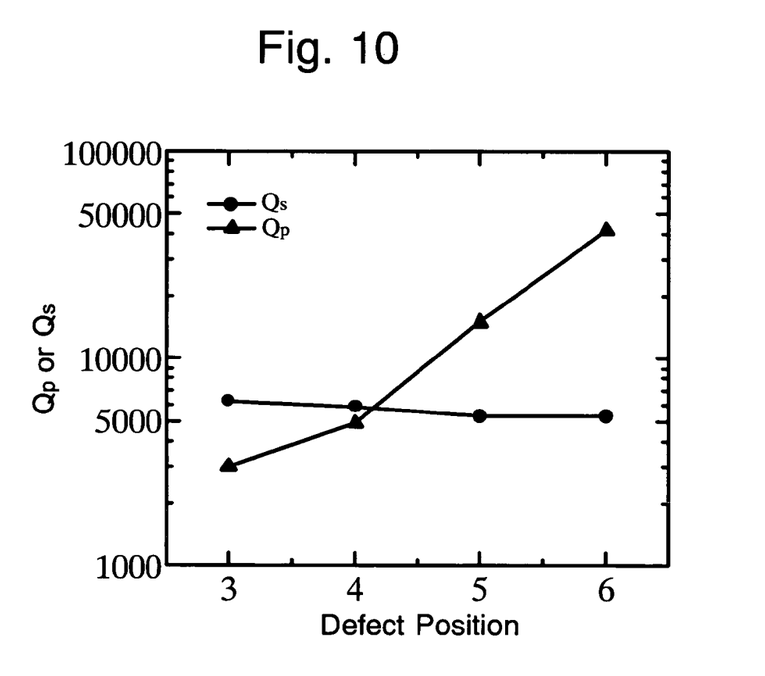
FIG. 10 is a graph showing the relation between the location of defect and $Q_p$ or $Q_s$.
Figure 11:
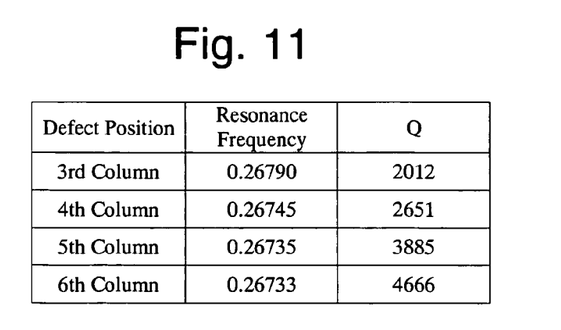
FIG. 11 is a table showing the relation between the location of defect and Q-factor.

The calculation suggests that the Q-factor of the donor type cluster defect can be higher than that of the acceptor type point defect. Particularly, it is expected that the defect with three lattice points filled along a straight line has the highest Q-factor. Taking this into account, the dependency of $Q_s$ and $Q_p$ on the distance between the point-like defect and the waveguide has been investigated. The result is shown in FIG. 10. In this figure, the abscissa indicates the distance between the lattice points filled along a straight line and the waveguide, represented by the number of columns of holes. Using $Q_s$ and $Q_p$, a Q-factor can be calculated by equation $1/Q=1/Q_s+1/Q_p$. From this equation and FIG. 10, the Q-factor can be obtained as shown in FIG. 11. This figure shows that the Q-factor is from 2012 to 4666, which is far greater than that in the case of Prior Art Document 1, i.e. about 500.

Figure 12:
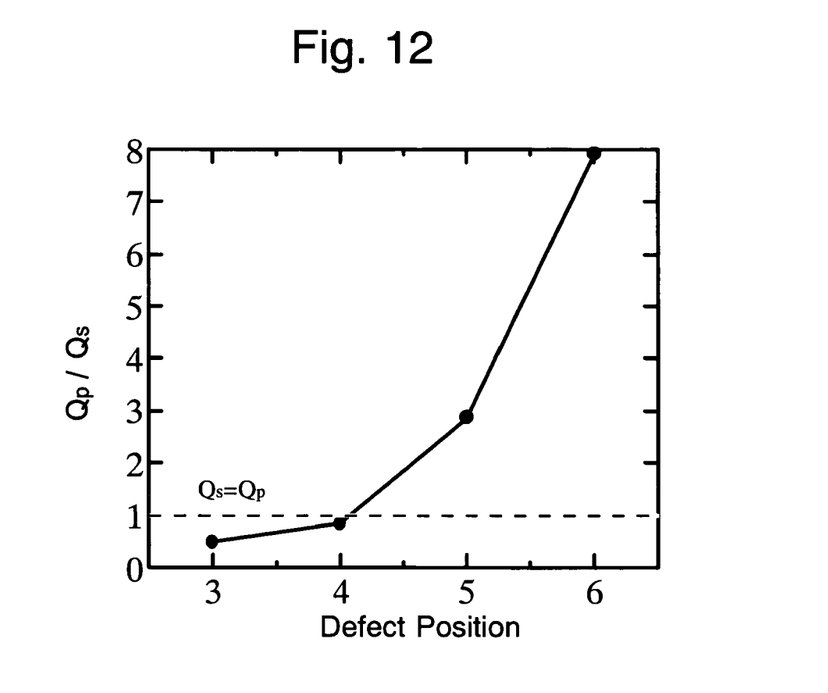
FIG. 12 is a graph showing the relation between the location of defect and $Q_p/Q_s$.

FIG. 11 shows that the Q-factor increases as the distance between the point-like defect and the waveguide increases. However, when the distance is too large, the light reaching the point-like defect decreases in the case of a demultiplexer, or the light reaching the waveguide decreases in the case of a multiplexer. Since these situations are undesirable for multiplexers/demultiplexers, the distance must be appropriately determined, taking into account the trade-off between the Q-factor and the delivery of light between the point-like defect and the waveguide. It seems that the highest efficiency is obtained when $Q_p=Q_s$. In FIG. 12, this condition is best satisfied when the point-like defect is located at the fourth column of holes from the waveguide.

The description in the previous paragraph focused on the efficiency as a multiplexer/demultiplexer. It is also possible to intentionally increase $Q_p$ and decrease $Q_s$. This setting allows the device to be used as a wavelength detection device for extracting and monitoring a small amount of light having a specific wavelength passing through the waveguide.

(1-4) Polarization Characteristics

Figure 13:
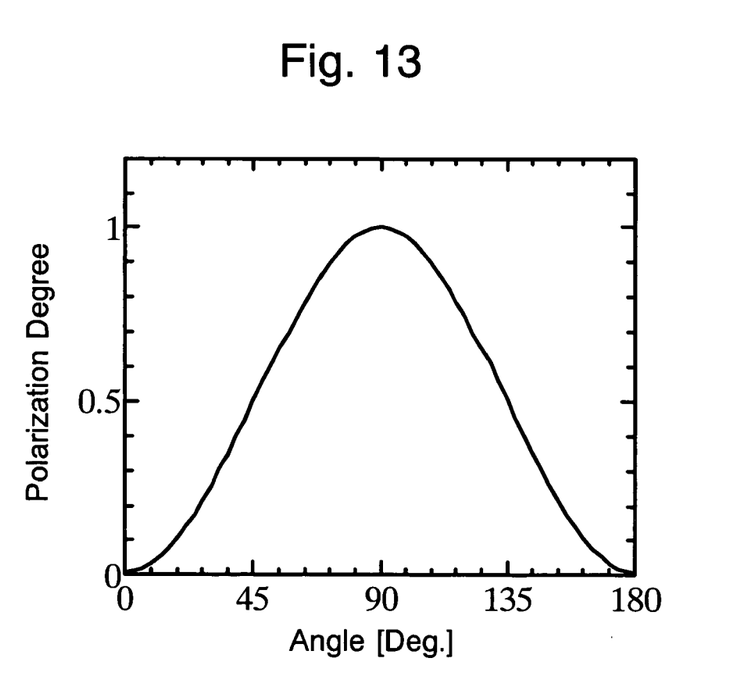
FIG. 13 is a graph showing the polarization characteristic of the donor type cluster defect with three lattice points filled along a straight line.

As mentioned in section (1-2), in the case of filling two lattice points or three lattice points along a straight line, it is expected that the light emitted thereby is linearly polarized. To confirm this idea, the polarization characteristics of the light emitted in the case of three lattice points filled along a straight line has been calculated. The result is shown in FIG. 13. In this figure, the abscissa indicates the in-plane angle from the line of the filled lattice points, and the ordinate indicates the amplitude of light at the angle. The amplitude is approximately zero in the direction where the angle is zero degree, while it is maximized in the direction where the angle is 90 degrees. This means that the light is strongly polarized in the direction perpendicular to the line of the filled lattice points.

(1-5) Controlling the Upward and Downward Emission Ratio of the Donor Type Cluster Defect The foregoing descriptions assumed that the point-like defect was symmetrical in the orthogonal direction. That is, it was assumed that each lattice point was completely filled with the low refractive index material. With this construction, the point-like defect emits light in both upward and downward directions.

Figure 14:
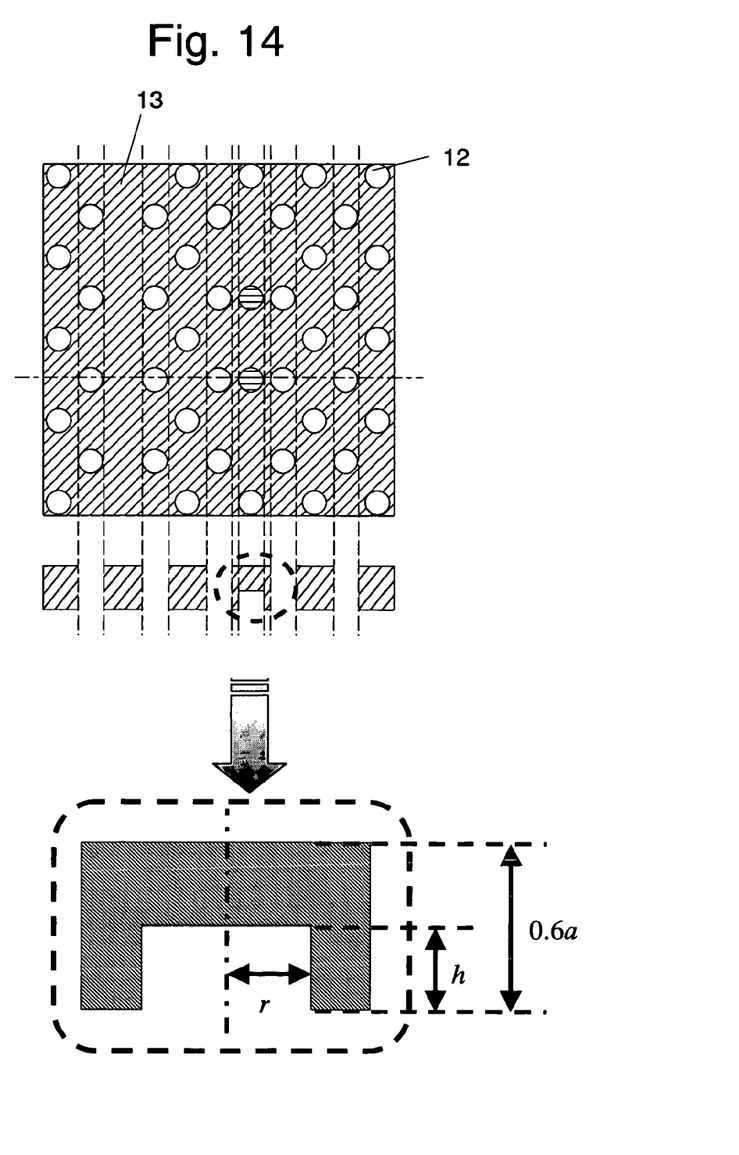
FIG. 14 is a schematic illustration showing an example of the donor type cluster defect asymmetrical in the orthogonal direction.
Figure 15:
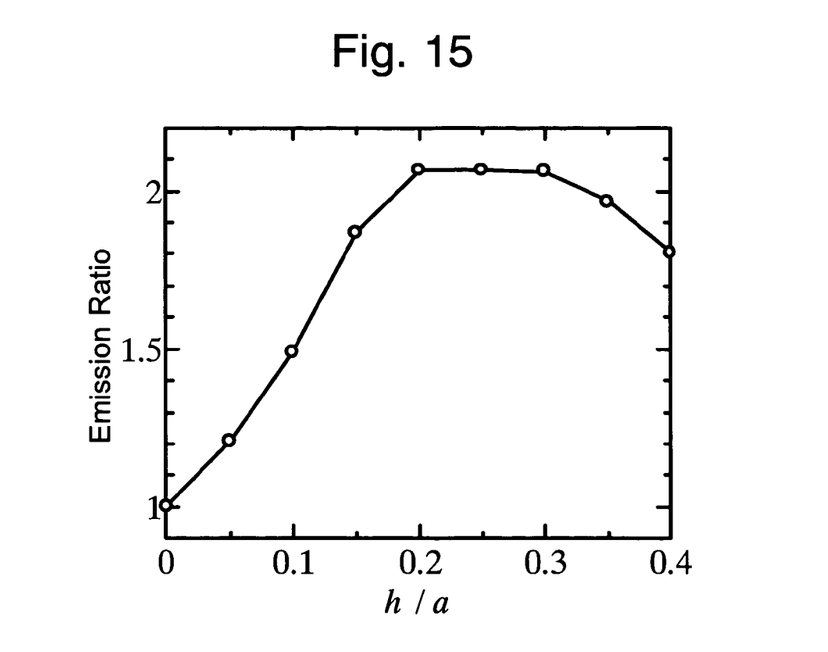
FIG. 15 is a graph showing the relation between the depth h of the hole bored at a point-like defect and the upward and downward emission ratio.
Figure 16:
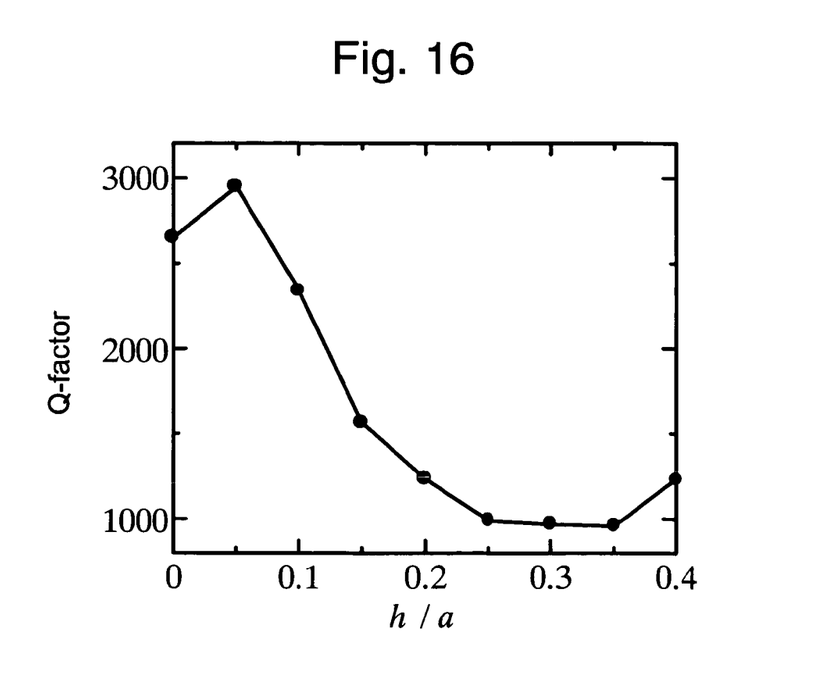
FIG. 16 is a graph showing the relation between the depth h of the hole bored at a point-like defect and the Q-factor of the resonator.

This section describes a calculation carried out under the condition that the donor type cluster defect is asymmetrical in the upward and downward direction, as shown in FIG. 14. In the example of FIG. 14, the body having a thickness of 0.6a is provided with three lattice points filled along a straight line and two intermediate holes having a radius r=0.29a and depth h (<0.6a) bored between the filled lattice points. Under this condition, the relation between the depth normalized by the lattice constant, h/a, and the upward and downward emission ratio has been calculated. The result is shown in FIG. 15. Within the range of h/a shown in this figure (i.e. 0.05-0.4), the upward and downward emissions from the defect are asymmetrical. Particularly, the upward and downward emission ratio is approximately 2.0 or higher within the range where h/a is between 0.2 and 0.4. FIG. 16 shows the relation between Q-factor and h/a. It shows that the Q-factor is rather low within the range where the upward and downward emission ratio is high. Even within this range, however, the Q-factor obtained hereby is higher than in the case of Prior Art Document 1.

(2) Embodiment of the Second Mode

Figure 17:
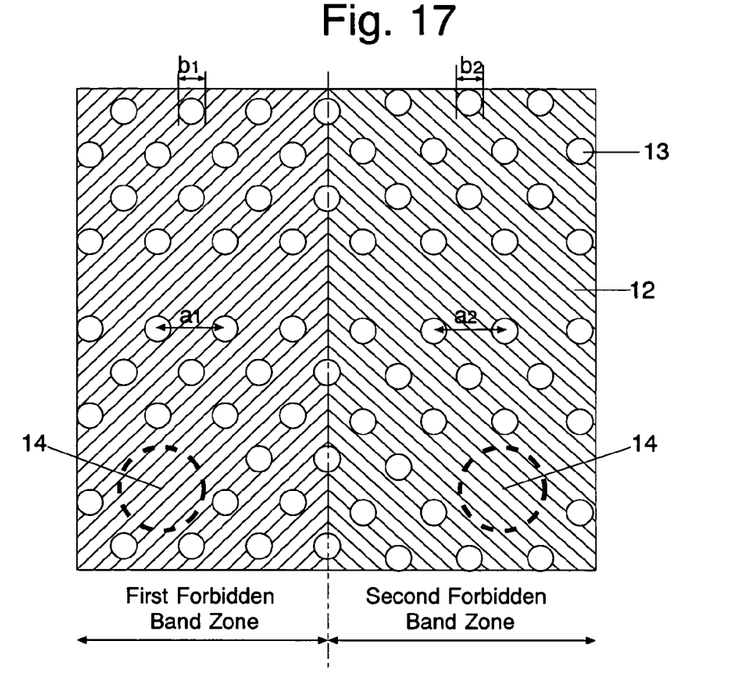
FIG. 17 is a schematic illustration showing an example of the in-plane heterostructure having donor type cluster defects.

FIG. 17 shows an example of the in-plane heterostructure as an embodiment of the second mode of the present invention. This figure shows an in-plane heterostructure consisting of two forbidden band zones. It consists of a crystal having holes (or low refractive index materials) arrayed at arrangement cycle $a_1$ and another crystal having holes arrayed at arrangement cycle $a_2$ connected along the central line indicated by the chain line. The first crystal having the arrangement cycle $a_1$ is called the first forbidden band zone and the second crystal having the arrangement cycle $a_2$ is called the second forbidden band zone hereinafter. The diameter of the holes in the first forbidden band zone is denoted by $b_1$, and that in the second forbidden band zone is denoted by $b_2$. The waveguides located on both sides of the chain line are arranged so that they lie on the same straight line. Donor type cluster defects having the same form are created in both first and second forbidden band zones. In this structure, $a_1/a_2$ is designed to be equal to $b_1/b_1$. Since the arrangement cycle of the holes determines the size of the donor type cluster defect, the ratio of the size of the donor type cluster defect in the first forbidden band zone to that in the second forbidden band zone is also equal to $a_1/a_2$.

Figure 18:
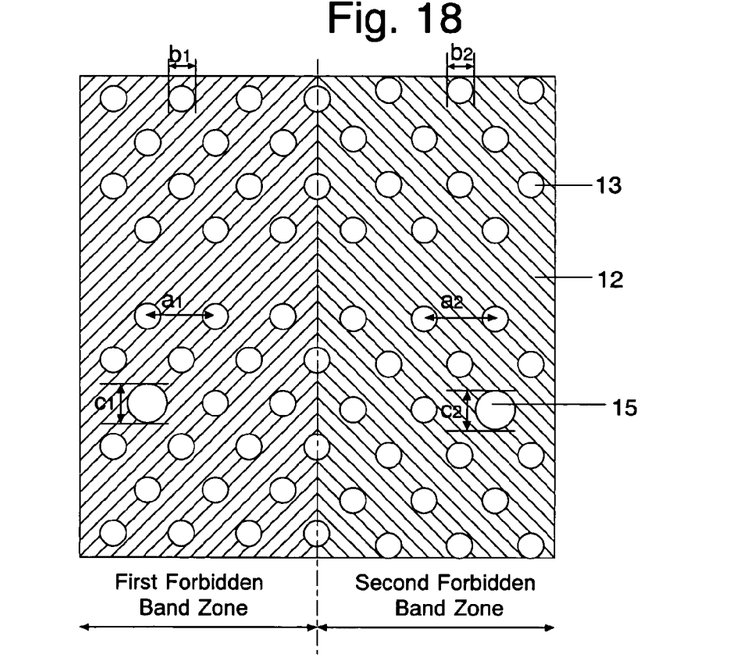
FIG. 18 is a schematic illustration showing an example of the in-plane heterostructure having acceptor type cluster defects.

In the example of FIG. 17, the donor type cluster defect is composed of three lattice points filled as a triangle. It is also possible to use a donor type cluster defect composed of three lattice points filled along a straight line, or other types. The point-like defect may be an acceptor type point defect, as shown in FIG. 18. In this case, the first forbidden band zone is provided with one acceptor type point defect having a diameter $c_1$, and the second forbidden band zone is provided with one acceptor type point defect having a diameter c2. The values of $a_1/a_2$, $b_1/b_2$ and $c_1/c_2$ should be equal to each other.

Figure 19:
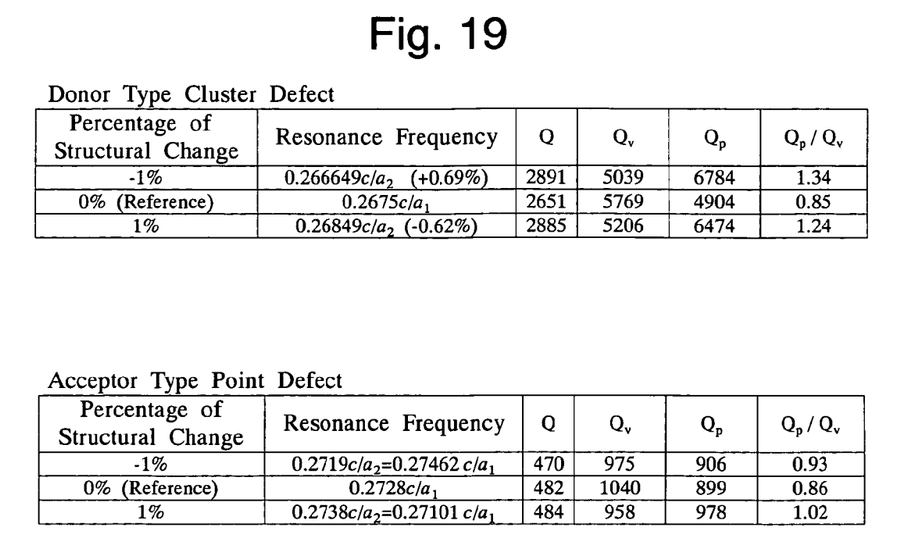
FIG. 19 shows tables showing the relation between the in-plane heterostructure and the Q-factor.

The Q-factor has been calculated for a structure having donor type cluster defects that are located as shown in FIG. 17 but each composed of three lattice points filled along a straight line, and for the structure shown in FIG. 18, under the following conditions: $a_1$ is equal to $a_2$; $a_1$ is 1% larger than $a_2$; and $a_1$ is 1% smaller than $a_2$. The structural difference between +1% and −1%, or total 2%, corresponds to the difference of 30 nm in the resonance wavelength in the 1.55 μm band. The following conditions is further assumed: $b_1=0.29a_1$, $b_2=0.29a_2$, $c_1=0.54a_1$, $c_2=0.54a_2$. FIG. 19 shows the Q-factors calculated. For FIGS. 17 and 18, $(1-a_2/a_1)$ has been defined as the percentage of structural change. In the case of using donor type cluster defects, the Q-factor is 2885-2891, which is adequately large. In the case of using acceptor type point defects, the Q-factors obtained are comparable to that of the two-dimensional photonic crystal using an acceptor type defect disclosed in Prior Art Document 1. The structural difference does not cause any significant decrease in Q-factor.

(3) Example of Fabricating a Two-Dimensional Photonic Crystal of the First and Second Modes of the Present Invention.

A method of fabricating a two-dimensional photonic crystal is disclosed in paragraphs [0037] to [0044] of the Japanese Unexamined Patent Publication No. 2001-272555, in which air is used as the low refractive index material. This method is briefly described here (for more detail, the aforementioned publication can be consulted). A slab to be used as the body is created by forming a layer of the slab material on a substrate by crystal growth. An example of the slab material is InGaAsP in the case where the wavelength band of the light of interest is the 1.55 μm band. A photoresist layer is formed on the surface of the slab, and an electron beam is irradiated onto it to draw a pattern corresponding to the low refractive index materials and the acceptor type point defects. The surface is gas-etched to form the low refractive index materials and the acceptor type point defects.

To fabricate a two-dimensional photonic crystal of the first mode of the present invention by the above-described method, the pattern-drawing process should be controlled so that a donor type cluster defect is introduced into the pattern by not irradiating the electron beam onto the area where the donor type cluster defect is to be located. Similarly, an in-plane heterostructure of the second mode of the present invention can be introduced by controlling the pattern-drawing process according to the structure.

The invention claimed is:

1. A two-dimensional photonic crystal optical multiplexer/demultiplexer, comprising:
    a slab-shaped body;
    a plurality of modified refractive index areas having a refractive index different from that of the body, which are periodically arranged in the body;
    a waveguide formed in the body making defects of the modified refractive index areas linearly; and
    a cluster defect located in proximity to the waveguide and composed of two or more adjacent defects without intervening non-defects, the defects being locations where the modified refractive index areas should exist, based on their periodic arrangement, but do not.

2. The two-dimensional photonic crystal optical multiplexer/demultiplexer according to claim 1, wherein the cluster defect is composed of three defects adjacent to each other in the form of a triangle.

3. The two-dimensional photonic crystal optical multiplexer/demultiplexer according to claim 1, wherein the cluster defect is composed of three defects adjacent to each other on a straight line parallel to the waveguide.

4. The two-dimensional photonic crystal optical multiplexer/demultiplexer according to claim 3, wherein the cluster defect composed of three defects adjacent to each other on a straight line is located on a fourth row of the modified refractive index areas from the waveguide.

5. A two-dimensional photonic crystal optical multiplexer/demultiplexer, comprising:
    a slab-shaped body;
    two or more forbidden band zones formed in the body;
    a plurality of modified refractive index areas having a refractive index different from that of the body, which are periodically arranged within each forbidden band zone of the body with a periodic cycle that is differently determined for each forbidden band zone;
    a waveguide passing through all the forbidden band zones, which is formed by making defects of the modified refractive index areas linearly within each forbidden band zone; and
    point-like defect resonators each composed of a point-like defect which is composed of one or more defects adjacent to each other and is formed in proximity to the waveguide within each of the forbidden band zones.

6. The two-dimensional photonic crystal optical multiplexer/demultiplexer according to claim 5, wherein at least one of the point-like defects each formed in proximity to the waveguide within each of the forbidden band zones is a cluster defect composed of two or more defects adjacent to each other.

7. The two-dimensional photonic crystal optical multiplexer/demultiplexer according to claim 6, wherein at least one of the point-like defects each formed in each of the forbidden band zones is a cluster defect composed of three defects adjacent to each other in the form of a triangle.

8. The two-dimensional photonic crystal optical multiplexer/demultiplexer according to claim 6, wherein at least one of the point-like defects each formed in each of the forbidden band zones is a cluster defect composed of three defects adjacent to each other on a straight line parallel to the waveguide.

9. The two-dimensional photonic crystal optical multiplexer/demultiplexer according to claim 8, wherein the cluster defect composed of three defects adjacent to each other on a straight line is located on a fourth row of the modified refractive index areas from the waveguide.

10. The two-dimensional photonic crystal optical multiplexer/demultiplexer according to claim 1, wherein the thickness of the modified refractive index area is 20 to 30% of the thickness of the body.

11. The two-dimensional photonic crystal optical multiplexer/demultiplexer according to claim 1, wherein the modified refractive index area is a low refractive index area whose refractive index is lower than that of the body.

12. The two-dimensional photonic crystal optical multiplexer/demultiplexer according to claim 11, wherein the low refractive index area is a hole.

13. The two-dimensional photonic crystal optical multiplexer/demultiplexer according to claim 5, wherein the defect of the modified refractive index area is composed of a modified refractive index area whose thickness extends from one face of the body to 5 to 40% of a thickness of the body.

14. The two-dimensional photonic crystal optical multiplexer/demultiplexer according to claim 13, wherein the thickness of the modified refractive index area is 20 to 30% of the thickness of the body.

15. The two-dimensional photonic crystal optical multiplexer/demultiplexer according to claim 5, wherein the modified refractive index area is a low refractive index area whose refractive index is lower than that of the body.

16. The two-dimensional photonic crystal optical multiplexer/demultiplexer according to claim 15, wherein the low refractive index area is a hole.

17. The two-dimensional photonic crystal optical multiplexer/demultiplexer according to claim 16, wherein the defect of the modified refractive index area is a donor type defect formed by not boring a hole in the body.

18. The two-dimensional photonic crystal optical multiplexer/demultiplexer according to claim 16, wherein the defect of the modified refractive index area is an acceptor type defect formed by providing a hole having a diameter larger than that of the other holes.

* * * * *